United States Patent [19]
Mason

[11] Patent Number: 5,401,813
[45] Date of Patent: Mar. 28, 1995

[54] TRANSPARENT POLYCARBONATE PBT BLENDS

[75] Inventor: James P. Mason, McKees Rocks, Pa.

[73] Assignee: Miles Inc., Pittsburgh, Pa.

[21] Appl. No.: 151,435

[22] Filed: Nov. 12, 1993

[51] Int. Cl.$^6$ .................... C08L 69/00; C08L 67/02
[52] U.S. Cl. ...................................... 525/439; 525/469
[58] Field of Search ........................................ 525/439

[56] References Cited

U.S. PATENT DOCUMENTS

| | | | |
|---|---|---|---|
| 4,515,925 | 5/1985 | Kleiner | 525/439 |
| 5,104,723 | 4/1992 | Freitag | 525/439 |
| 5,132,154 | 7/1992 | Westeppe | 525/462 |

Primary Examiner—David Buttner
Attorney, Agent, or Firm—Joseph C. Gil; Aron Preis

[57] ABSTRACT

Thermoplastic molding compositions containing
 (i) polybutylene terephthalate
 (ii) a first aromatic polycarbonate resin, and
 (iii) a second aromatic polycarbonate resin
are disclosed. A high level of Total Light Transmission (herein TLT) is a key characteristic of the compositions of the invention. Preferably, the TLT values of the compositions are higher than those of compositions which contain only said (i) and either (ii) or (iii). Most preferably, the TLT values of the compositions are higher than 80%.

3 Claims, No Drawings

TRANSPARENT POLYCARBONATE PBT BLENDS

FIELD OF THE INVENTION

The invention relates to thermoplastic molding compositions and more particularly to compositions containing polybutylene terephthalate.

SUMMARY OF THE INVENTION

Thermoplastic molding compositions containing
(i) polybutylene terephthalate
(ii) a first aromatic polycarbonate resin, and
(iii) a second aromatic polycarbonate resin
are disclosed. A high level of Total Light Transmission (herein TLT) is a key characteristic of the compositions of the invention. Preferably, the TLT values of the compositions are higher than those of compositions which contain only said (i) and either (ii) or (iii). Most preferably, the TLT values of the compositions are higher than 80%.

BACKGROUND OF THE INVENTION

Thermoplastic molding compositions are being used in a wide variety of applications because of their attractive profile of mechanical and physical properties. A key property for many applications is the transparency of the composition. Blends of polycarbonates and polybutylene terephthalate (herein PBT) are known and compositions containing the blend are characterized by high impact and chemical resistance properties. It has been the experience of workers in the art that blends of PBT and polycarbonate are opaque.

A commercial terephthalates of ethylene glycol and cyclohexane dimethanol and polycarbonate is noted for its transparency. A co-pending patent application Ser. No. 08/093,834, filed Jul. 19, 1993, refers to a transparent composition containing polyethylene terephthalate.

It is an object of the present invention to provide thermoplastic compositions containing PBT and polycarbonate resins which exhibit improved TLT values.

DETAILED DESCRIPTION OF THE INVENTION

Accordingly there are disclosed thermoplastic molding compositions which contain (i) polyethylene terephthalate (ii) a first aromatic polycarbonate resin and (iii) a second aromatic polycarbonate resin which differs from said first in that it contains at least some structural units derived from a dihydroxy compound having a bridging unit corresponding to

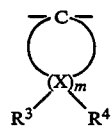

wherein $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms, and where m is an integer of 4 to 10. Preferably, the second aromatic polycarbonate resin contains about 10 to 100%, most preferably about 30 to 80% of said structural units.

The invention thus also relates to a method for increasing the TLT values of a thermoplastic molding composition which contains (i) polybutylene terephthalate and either one of (ii) a first aromatic polycarbonate resin or (iii) a second aromatic polycarbonate resin. The method comprises incorporating in the composition the complementary component selected from the group consisting of said (ii) and (iii) to form a blend containing PBT, (ii) and (iii). The TLT value of the composition being determined in accordance with ASTM D-1003 using specimens 0.100" in thickness.

The polybutylene terephthalate useful in the present context is a well know thermoplastic resin which is readily available in commerce. It is derived from terephthalic acid and butylene diol and is characterized in that its intrinsic viscosity is at least 0.4, preferably 0.4 to 1.4, most preferably 0.4 to 1.1 deciliter per gram, as measured in a 1 percent solution of phenol and tetrachloro-ethane (60:40) at 25° C. Optionally, the aromatic terephthalic acid component may be combined with up to 15 percent of additional acid component, including at least one of isophthalic acid, naphthalene-dicarboxylic acid, diphenylether dicarboxylic acid, diphenyldicarboxylic acid, diphenylsulphone dicarboxylic acid, and diphenoxyethane dicarboxylic acid. Also optional are hydroxy-carboxylic acid which are not aromatic including aliphatic dicarboxylic acids such as succinic acid, adipic acid and sebacic acid.

The diol component may contain in addition to butylene glycol up to 15 percent relative to the molar amount of the glycol of co-diols. These include aliphatic diols having up to 8 carbon atoms, cycloaliphatic diols having 6 to 15 carbon atoms or aromatic diols having 6 to 21 carbon atoms. Examples of such co-diols include 3-methylpentane diol-(2,4), 2-methyl-pentadiol-(1,4), 2,2,4-trimethylpentanediol-(1,3), 2-ethyl-hexanediol(1,3), 2,2-diethyl-propanediol(1,3), hexane diol(1,3), 1,4di(hydroxyethoxy)-benzene, 2,2-bis-(4-hydroxycyclohexyl)-propane, 2,4-hydroxy-1,1,3,3-tetramethylcyclobutane, 2,2-bis-(3-hydroxyethoxyphenyl-propane, and 2,2-bis(4-hydroxypropoxyphenyl)-propane.

The PBT resins may be branched by incorporating trihydric or tetrahydric alcohols or tribasic or tetrabasic acids of the type and in the manner known in the art. Chain terminators suitable in the preparation of such PBT resins are also well known in the art.

Methods for the preparation of suitable PBT resin are known and have been described in U.S. Pat. Nos. 2,463,319 and 3,047,539 which are incorporated herein by reference. Most suitable in the present context is polybutylene terephthalate.

The first polycarbonate resin is derived from at least one dihydroxy compound conforming to formula (1) or (2)

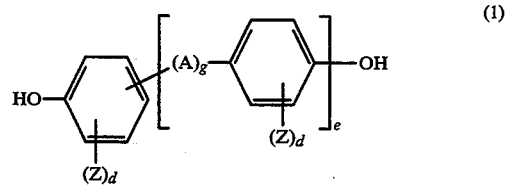

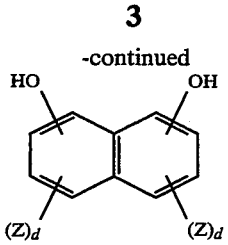

(2)

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —SO$_2$— radical or a radical conforming to

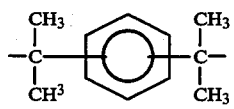

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms with the proviso that dihydroxydiphenyl cyclohexane conforming to formula (3) are excluded.

Among the useful dihydroxy compounds in the practice of the invention are hydroquinone, resorcinol, bis-(hydroxypheny) alkanes, bis-(hydroxyphenyl)-cycloalkanes, bis-(hydroxyphenyl) ethers, bis-(hydroxyphenyl)-ketones, bis-(hydroxyphenyl) sulfoxides, bis-(hydroxyphenyl)-sulfones and 2,2-bis (hydroxphenyl)-diisopropyl-benzenes. These and further suitable aromatic dihydroxy compounds are described, for example in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegunsschrifien (German Published Specifications) Nos. 1,570,703, 2,063,050, 2,063,052, 2,211,956 and 2,211,957 in French Patent Specification No. 1,561,418 and in the monograph, H. Schnell, Chemistry and Physics of Polycarbonates, Interscience Publishers, New York, 1964. Further examples of suitable bisphenols are 2,2-bis-(4-hydroxy-phenyl)-propane (bisphenol A), 2,4-bis-(4-hydroxyphenyl)-2-methylbutane, 1,1-bis(4-hydroxyphenyl)-cyclohexane, 2,2-bis-(4-hydroxyphenyl)-p-diisopropylbenzene, 2,2-bis(3-chloro-4-hydroxy-phenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process polycondensation in a homogeneous phase or by transesterification.

The suitable processes and the associated reactants catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention, monofunctional reactants such as monophenols may be used in order to limit their respective molecular weights. Also, branching agents may be employed. Branching may be obtained by the incorporation of small amount, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschrifien (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimenthyl-2,4,6-tri-(4-hydroxyphenyl)-heptane, 2,4,6-trimethyl-2,4,6,tri-(4-hydroxyphenyl)-heptane, 1,4,5-tri-(4-hydroxyphenyl)-benzene, 1,1,1-tri-(4-hydroxy-phenyl)-ethane, tri-(4-hydroxyphenyl)-phenylmethane, 2,2-bis-[4,4-bis-(4-hydroxyphenyl)-cyclohexyl]-propane, 2,4-bis(4-hydroxyphenylisoproply)-phenol, 6-bis(2-hydroxy-5'-methylbenzyl)-4-methylphenol, 2-(4-hydroxyphenyl)-2-(2,4-dihydroxyphenyl)propane, hexa(4-(4-hydroxy-phenylisopropyl)-phenyl)orthoterephthalic acid ester, tetra-(4-hydroxyphenyl)-methane tetra-(4-(4-hydroxy-phenyl-isopropyl)-phenoxy)-methane and 1,4-bis-(4'-4"-dihydroxytriphenyl)-methyl)-benzene. Some of the other trifunctional compounds are 2,4-dihydroxy-benzoic acid, trimesic acid, dyanuric chloride and 3,3-bis-(4-hydroxyphenyl)-2-oxo-2,3-dihydroindole.

Among the resins suitable in the practice of the invention are included phenolphthalene based polycarbonate, copoly-carbonates and terpolycarbonates such as are described in U.S. Pat. Nos. 3,036,036 and 4,210,741, both incorporated by reference therein.

The second aromatic polycarbonate resin is derived from at least one dihydroxy compound conforming to formula (3)

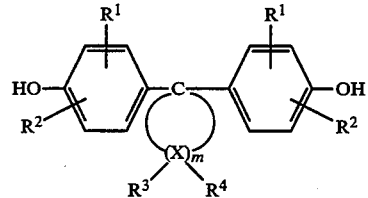

wherein $R^1$ and $R^2$ independently represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$ alkyl, in particular benzyl; m denotes an integer of 4 to 10, preferably 4–5; $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms. Preferably both $R^3$ and $R^4$ represent alkyl on one or 2 X carbon atoms, most preferably only on one X carbon atom. Methyl is the preferred alkyl radical; the X atoms in the alpha position to the diphenyl substituted carbon atom (C-1) are preferably not dialkyl substituted; two alkyl substituents in the beta-position to C-1 is preferred.

Dihydroxydiphenylcyclohexanes having 5 or 6 ring carbon atoms in the cycloaliphatic radical (m represents 4 or 5 in general formula (I), for examples the diphenols:

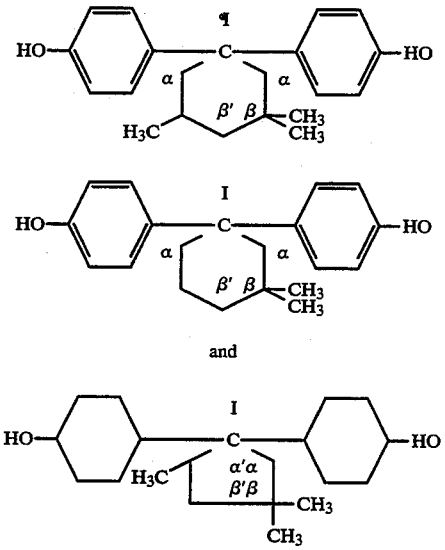

and are preferred, 1,1-bis-(4-hydroxyphenyl)-3,3,5-trimethylcyclo-hexane (II) being particularly preferred.

The invention is further illustrated but is not intended to be limited by the following examples in which all parts and percentages are by weight unless otherwise specified.

EXAMPLES

Experimental

Compositions in accordance with the invention have been prepared and their properties evaluated. The preparation of the compositions in an extruder followed conventional procedures.

| Screw Design: | Blends |
| --- | --- |
| screw speed | 300 |
| feed rate | 140 |
| Set temperatures, C. | |
| Zone 1 | 200 |
| Zone 2 | 250 |
| Zone 3 | 260 |
| Zone 4 | 270 |
| Zone 5 | 280 |
| Die | 290 |
| Vacuum, inches | Max |
| actual melt temperature | — |

Test specimens measuring 0.100" (thickness) were molded by injection following conventional procedures. TLT values were determined following the procedure described in ASTM D-1003 using a Match-Scan I Spectrophotometer (Diano Corporation). The following materials were used in preparing the compositions: PBT: a polybutylene terephthalate resin having an intrinsic viscosity of about 0.95; a product of DuPont; Polycarbonate (PC): Makrolon 2600 polycarbonate, a homopolycarbonate based on bisphenol-A, having a melt flow rate of 12 g/10 min.; a product of Miles Inc. APEC: a product of Bayer AG, available from Miles Inc., which is a copolycarbonate based on bisphenol A and containing 55 mole % of structural units conforming to

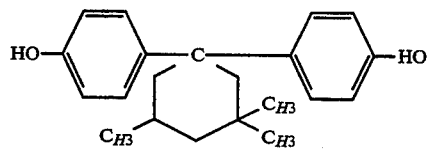

The table below summarized the results of the evaluations. The amount of each component is noted in percent relative to the weight of the composition.

| Composition | PC | PBT | APEC | TLT | Haze | YI |
| --- | --- | --- | --- | --- | --- | --- |
| 1 | 50.0 | 50.0 | 0.0 | opq* | | |
| 2 | 25.0 | 50.0 | 25.0 | opq | | |
| 3 | 0.0 | 50.0 | 50.0 | opq | | |
| 4 | 80.0 | 20.0 | 0.0 | 80.0 | 3.1 | 20.4 |
| 5 | 55.0 | 20.0 | 25.0 | 85.0 | 0.6 | 14.2 |
| 6 | 26.0 | 21.0 | 53.0 | 84.0 | 0.7 | 15.9 |
| 7 | 0.0 | 20.0 | 80.0 | 78.0 | 2.8 | 24.3 |
| 8 | 0.0 | 100.0 | 0.0 | opq | | |

*opq denotes opaque
YI denotes Yellowness index

The thermoplastic molding composition of the invention contains (i) polybutylene terephthalate (ii) a first aromatic polycarbonate resin, and (iii) a second aromatic polycarbonate resin. The compositions are characterized in their high level of Total Light Transmission. The TLT values of the compositions of the invention is higher than the value of PBT based composition which contain but one of said (ii) and said (iii). Preferably, the TLT values of the compositions are higher than 80%, their haze values are at most 1% and their yellowness index is lower than 20.0%. Suitable compositions contain 1 to 30 polybutylene terephthalate, 1 to 98% of the first aromatic polycarbonate and 1 to 98% of the second aromatic polycarbonate. More preferably the compositions contain 1 to 30%, more narrowly 5 to 30% polybutylene terephthalate, 20 to 60% of the first aromatic polycarbonate and 20 to 60% of the second aromatic polycarbonate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for increasing the TLT value of a thermoplastic molding composition which contains 1 to 30 % relative to its weight of polybutylene terephthalate the balance being either one of (i) a first aromatic polycarbonate resin or (ii) a second aromatic polycarbonate resin, comprising substituting at least some of said balance by the complementary component selected from said (ii) and said (i), to form a blend containing polybutylene terephthalate, (i) and (ii), wherein each of said (i) and said (ii) is present in the composition having increased TLT value in an amount of 20 to 60% by weight, said second aromatic polycarbonate resin being different from said first aromatic polycarbonate resin in that it contains about 10 to 100% structural units derived from a dihydroxy compound having a bridging unit corresponding to

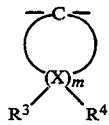

wherein $R^3$ and $R^4$ independently one of the other represents a hydrogen atom or a $C_{1-6}$ alkyl and X denotes carbon, with the proviso that $R^3$ and $R^4$ both represent an alkyl radical on at least one of the X carbon atoms, and where m is an integer of 4 to 10, said TLT being determined in accordance with ASTM D-1003 using specimens 0.100" in thickness.

2. The composition prepared in accordance with the method of claim 1.

3. The composition of claim 2 wherein said first aromatic polycarbonate resin is derived from a dihydroxy compound conforming to formula (1) or (2)

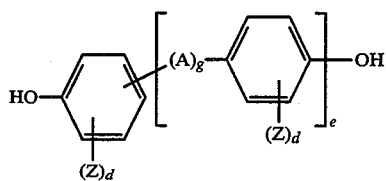

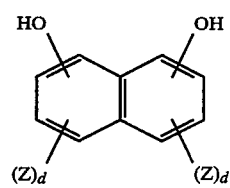

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —SO$_2$— radical or a radical conforming to

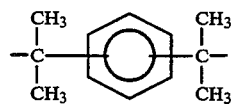

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms.

* * * * *